US012735561B2

(12) United States Patent
Ahn et al.

(10) Patent No.: US 12,735,561 B2
(45) Date of Patent: Sep. 15, 2026

(54) METHOD OF PREPARING VINYL CHLORIDE-BASED POLYMER COMPOSITE, VINYL CHLORIDE-BASED POLYMER COMPOSITE, AND VINYL CHLORIDE-BASED POLYMER COMPOSITE COMPOSITION INCLUDING THE COMPOSITE

(71) Applicant: LG CHEM, LTD., Seoul (KR)

(72) Inventors: Seong Yong Ahn, Daejeon (KR); Kun Ji Kim, Daejeon (KR); Heung Kwon Bae, Daejeon (KR); Se Woong Lee, Daejeon (KR); Hyun Kyou Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1179 days.

(21) Appl. No.: 17/771,807

(22) PCT Filed: May 7, 2021

(86) PCT No.: PCT/KR2021/005703
§ 371 (c)(1),
(2) Date: Apr. 25, 2022

(87) PCT Pub. No.: WO2021/225394
PCT Pub. Date: Nov. 11, 2021

(65) Prior Publication Data

US 2022/0380587 A1 Dec. 1, 2022

(30) Foreign Application Priority Data

May 7, 2020 (KR) ........................ 10-2020-0054604
May 6, 2021 (KR) ........................ 10-2021-0058488

(51) Int. Cl.
*C08L 27/06* (2006.01)
*C08F 14/06* (2006.01)

(52) U.S. Cl.
CPC .............. *C08L 27/06* (2013.01); *C08F 14/06* (2013.01)

(58) Field of Classification Search
CPC .. C08L 27/06; C08L 29/04; C08F 2/02; C08F 14/06
See application file for complete search history.

(56) References Cited

U.S. PATENT DOCUMENTS 3,855,162 A * 12/1974 Durand ................... C08F 14/06 524/769
5,852,140 A 12/1998 Georges et al.
2011/0130504 A1* 6/2011 Kato ....................... C08L 27/06 524/399
2011/0213063 A1* 9/2011 Kato ....................... C08L 27/06 524/80
2012/0309880 A1 12/2012 Takeshi et al.
2016/0311943 A1 10/2016 Youk et al.
2017/0121438 A1 5/2017 Ju et al.
2018/0044451 A1 2/2018 Van et al.
2018/0355078 A1 12/2018 Ahn et al.

FOREIGN PATENT DOCUMENTS

| | | | |
|---|---|---|---|
| CN | 103119073 | A | 5/2013 |
| CN | 107056972 | A | 8/2017 |
| CN | 108290978 | A | 7/2018 |
| EP | 3243852 | A1 | 11/2017 |
| JP | H07-252305 | A | 10/1995 |
| JP | H08-231614 | A | 9/1996 |
| JP | H10-226705 | A | 8/1998 |
| JP | 2002-332308 | A | 11/2002 |
| JP | 2018-507311 | A | 3/2018 |
| KR | 2012-0007227 | A | 1/2012 |
| KR | 2016-0035439 | A | 3/2016 |
| KR | 2017-0004703 | A | 1/2017 |
| KR | 10-1808048 | B1 | 12/2017 |
| KR | 2018-0034223 | A | 4/2018 |
| WO | 2011/093487 | A1 | 4/2011 |

OTHER PUBLICATIONS

JP2002332308A machine translation (Year: 2025).*
Extended European Search Report dated Sep. 5, 2023, issued in European Patent Application No. 21799556.2.
International Search Report (with translation) and Written Opinion dated Mar. 24, 2011, issued in corresponding International Patent Application No. PCT/JP2011/051885.

* cited by examiner

*Primary Examiner* — Jeffrey S Lenihan
(74) *Attorney, Agent, or Firm* — Morgan, Lewis & Bockius LLP

(57) ABSTRACT

Provided are a method of preparing a vinyl chloride-based polymer composite, a vinyl chloride-based polymer composite, and a vinyl chloride-based polymer composite composition including the composite, the method including: a first step of performing bulk polymerization of vinyl chloride-based monomers; and a second step of recovering unreacted vinyl chloride-based monomers after the completion of the bulk polymerization and obtaining a vinyl chloride-based polymer composite, wherein polyvinyl alcohol is added in at least one step of the first step and the second step, and the polyvinyl alcohol is added in an amount of 0.003 parts by weight to 0.500 parts by weight based on a total of 100 parts by weight of the vinyl chloride-based monomers.

9 Claims, No Drawings

METHOD OF PREPARING VINYL CHLORIDE-BASED POLYMER COMPOSITE, VINYL CHLORIDE-BASED POLYMER COMPOSITE, AND VINYL CHLORIDE-BASED POLYMER COMPOSITE COMPOSITION INCLUDING THE COMPOSITE

CROSS-REFERENCE TO RELATED APPLICATION

This application claims priority to and the benefit of Korean Patent Application No. 10-2020-0054604, filed on May 7, 2020, and Korean Patent Application No. 2021-0058488, filed on May 6, 2021, the disclosures of which are incorporated herein by reference in their entirety.

TECHNICAL FIELD

The present invention relates to a method of preparing a vinyl chloride-based polymer composite, a vinyl chloride-based polymer composite, and a vinyl chloride-based polymer composite composition including the composite, and particularly, to a method of preparing a vinyl chloride-based polymer composite, which allows thermal stability, color quality, and transparency to be improved by adding polyvinyl alcohol during or after a polymerization process, a vinyl chloride-based polymer composite, and a vinyl chloride-based polymer composite composition including the composite.

BACKGROUND ART

Vinyl chloride-based polymers are the most widely used synthetic resins among thermoplastic resins. Polymerization methods of vinyl chloride-based polymers include suspension polymerization, emulsion polymerization, and bulk polymerization. Among them, bulk polymerization is performed by supplying only a vinyl chloride-based monomer, an initiator, and, if necessary, a reaction additive without using a solvent, a dispersant, and an emulsifier. Polymers polymerized by bulk polymerization are processed and used as raw materials for chlorinated PVC, pipes, sashes, shoe insoles, films, and the like, and, among them, they are widely used for pipes. Bulk polymerization has advantages in that equipment is simple, the reaction proceeds fast, purification processes such as distillation, extraction, and the like are not required to achieve a high yield, high-purity polymers can be obtained, and the obtained polymers can be handled as they are.

However, bulk polymerization has a disadvantage in that temperature control is difficult due to a large amount of heat generated in a polymerization process. Also, bulk polymerization has a disadvantage in that there are no materials capable of absorbing and removing the heat of polymerization apart from a vinyl chloride-based monomer, and the viscosity of a polymer increases as polymerization proceeds, and thus the diffusion of the heat of reaction by conduction or convection is difficult. Therefore, the vinyl chloride-based polymer prepared by bulk polymerization may be thermally damaged due to the heat of reaction generated in the bulk polymerization process or unexpectedly generated heat, so it is very important to ensure the thermal stability of the vinyl chloride-based polymer.

Accordingly, to improve thermal stability during polymerization and/or the thermal stability of the finally prepared vinyl chloride-based polymer/vinyl chloride-based polymer composite, Chinese Laid-Open Patent Publication No. 107056972 proposes using a specific type of initiator composition in a pre-polymerization step (preliminary polymerization step). In addition, Korean Laid-Open Patent Publication No. 2016-0035439 proposes a preparation method in which an oxocarboxylic acid, inorganic phosphate, or ethylenediaminetetraacetate is added during bulk polymerization. Additionally, Korean Laid-Open Patent Publication No. 2017-0004703 proposes a preparation method in which copolymerization with a comonomer having excellent heat resistance is performed. However, since the conventionally proposed methods alone are insufficient to improve thermal stability, there is still a limitation in overcoming the disadvantages of the bulk polymerization method which has poor thermal stability.

Therefore, there is an urgent need to develop a technique for preparing a vinyl chloride-based polymer/vinyl chloride-based polymer composite with substantially improved thermal stability to a level equal to or higher than that of other polymerization methods in the preparation of a vinyl chloride-based polymer or a vinyl chloride-based polymer composite using a bulk polymerization method.

RELATED-ART DOCUMENTS

Patent Documents (Patent Document 1) CN107056972A
(Patent Document 2) KR2016-0035439A
(Patent Document 3) KR2017-0004703A

DISCLOSURE

Technical Problem

The present invention is directed to providing a method of preparing a vinyl chloride-based polymer composite using polyvinyl alcohol that is capable of serving as both a thermal stabilizer and an antioxidant.

The present invention is also directed to providing a vinyl chloride-based polymer composite and a vinyl chloride-based polymer composite composition, which are excellent in all of thermal stability, color quality, and transparency.

Technical Solution

One aspect of the present invention provides a method of preparing a vinyl chloride-based polymer composite, which includes: a first step of performing bulk polymerization of vinyl chloride-based monomers; and a second step of recovering unreacted vinyl chloride-based monomers after the completion of the bulk polymerization and obtaining a vinyl chloride-based polymer composite, wherein polyvinyl alcohol is added in at least one step of the first step and the second step, and the polyvinyl alcohol is added in an amount of 0.003 parts by weight to 0.500 parts by weight based on a total of 100 parts by weight of the vinyl chloride-based monomers.

Another aspect of the present invention provides a vinyl chloride-based polymer composite which includes: a vinyl chloride-based polymer; and polyvinyl alcohol adsorbed onto the vinyl chloride-based polymer, wherein the polyvinyl alcohol is included in an amount of 0.003 parts by weight to 0.800 parts by weight based on 100 parts by weight of the vinyl chloride-based polymer.

Still another aspect of the present invention provides a vinyl chloride-based polymer composite composition which includes: the above-described vinyl chloride-based polymer composite; and one or more selected from the group consisting of a stabilizer, a processing aid, an impact modifier, and a lubricant.

Advantageous Effects

A method of preparing a vinyl chloride-based polymer composite according to the present invention can minimize thermal damage to a vinyl chloride-based polymer, which may occur due to the heat unexpectedly generated in a bulk polymerization process in which temperature control is difficult and/or due to the heat applied in a post-treatment process for removing an unreacted monomer, by adding polyvinyl alcohol during and/or after polymerization. In addition, a vinyl chloride-based polymer composite prepared while being protected from heat can exhibit excellent thermal stability even when used as a product after the preparation. Additionally, polyvinyl alcohol can suppress side reactions of an initiator, which may occur in a bulk polymerization process. Accordingly, the coloration of the vinyl chloride-based polymer composite, which is caused by the side reactions, can be minimized to enhance color quality and transparency.

As a vinyl chloride-based polymer composite according to the present invention includes polyvinyl alcohol, vinyl chloride-based polymer particles can be protected from deformation caused by heat generated by polymerization and deformation caused by heat generated in a post-treatment process for removing a residual unreacted monomer in bulk polymerization not using water, and accordingly, thermal stability, color quality, and transparency all can be improved.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

As used herein, the term "polymer" refers to a polymer prepared by polymerizing the same type or different types of monomers. Therefore, the generic term polymer encompasses the term "homopolymer," which is commonly used to refer to a polymer formed of only one type of monomer, and the term "copolymer," which refers to a polymer formed of two or more types of monomers.

As used herein, the term "vinyl chloride-based polymer" commonly refers to a compound produced by polymerizing vinyl chloride-based monomers and may mean a polymer chain derived from vinyl chloride-based monomers.

As used herein, the term "vinyl chloride-based polymer composite" may be formed by adsorbing an additive, for example, polyvinyl alcohol, onto a vinyl chloride-based polymer. In this case, the adsorption may encompass both physical adsorption using Vander Waals force and chemical adsorption involving chemical bonds. Also, the chemical bonds involved in the chemical adsorption may encompass all of typically known chemical bonds such as a covalent bond, an ionic bond, a coordinate bond, and the like. For example, the chemical bonds are meant to encompass not only a covalent bond between a vinyl chloride-based monomer and a polyvinyl alcohol unit or a covalent bond between a vinyl chloride-based polymer unit and a polyvinyl alcohol unit but also the inclusion of polyvinyl alcohol in the main chain of a vinyl chloride-based polymer by polyvinyl alcohol participating in the polymerization of the vinyl chloride-based polymer.

As used herein, the terms "first vinyl chloride-based monomer" and "second vinyl chloride-based monomer" are intended to distinguish the order in which they participate in the reaction, and the materials themselves may mean the same vinyl chloride-based monomer.

As used herein, the term "particle non-uniformity" represents the non-uniformity or roughness of a particle surface and is defined as the average value of the diameter standard deviation of individual particles after obtaining the standard deviation among diameters in multiple directions for 50 particles in a polymer. As the value is smaller, the standard deviation among the diameters of individual particles is smaller, that is, the diameters in multiple directions of the particle have similar values, indicating that the particle is almost spherical. Also, this may mean that the roughness of the particle surface is low or the particle surface is smooth.

In the present invention, a number-average molecular weight (Mn) is measured via a refractive index detector (RI detector) at a flow rate of 1.0 ml/min using a gel permeation chromatography (GPC) system (Waters Breeze) after 0.02 g of a polymer sample is diluted with 20 ml of a tetrahydrofuran (THF) solvent and filtered through a 0.45 μm filter. As a standard for calculating the molecular weight of the sample, eight PS standards were measured to prepare a calibration curve, and then the molecular weight of the sample was calculated based on the calibration curve.

The Breeze GPC system includes an isocratic pump (Waters1515), a refractive index detector (RI detector; Waters2424), an autosampler (Waters717+), two columns (Waters HR4, HR5), and a column heater chamber.

In the present invention, the viscosity and degree of polymerization of polyvinyl alcohol are measured in accordance with JIS K 6726 standard (Testing methods for polyvinyl alcohol).

In the present invention, the degree of hydrolysis of polyvinyl alcohol is measured using $^{1}H$ 500 MHz NMR. In this case, polyvinyl alcohol is used after being diluted to a concentration of5 wt % (wt/vol) with a dimethyl sulfoxide (DMSO) solvent, and NMR measurement conditions are as follows.

Temperature: 60° C.

$^{1}H$ NMR standard: Tetramethylsilane (TMS)

Pulse interval: 5 sec

Scan number: 256

1. Method of Preparing Vinyl Chloride-Based Polymer Composite

A method of preparing a vinyl chloride-based polymer composite according to an embodiment of the present invention includes: a first step of performing bulk polymerization of vinyl chloride-based monomers; and a second step of recovering unreacted vinyl chloride-based monomers after the completion of the bulk polymerization and obtaining a vinyl chloride-based polymer composite, wherein polyvinyl alcohol is added in at least one step of the first step and the second step, and the polyvinyl alcohol is added in an amount of 0.003 parts by weight to 0.500 parts by weight based on a total of 100 parts by weight of the vinyl chloride-based monomers.

In this case, the total of 100 parts by weight of the vinyl chloride-based monomer may mean "the total amount (100 parts by weight) of the vinyl chloride-based monomers added in the method of preparing a vinyl chloride-based polymer composite".

The first step may be performed, for example, in the presence of an initiator. Specifically, the first step may include: a preliminary polymerization step of performing bulk polymerization of first vinyl chloride-based monomers to form particle nuclei (step 1-1); and a main polymerization step of performing bulk polymerization of the particle nuclei and second vinyl chloride-based monomers (step 1-2). For example, the preliminary polymerization step may be a step of performing bulk polymerization of first vinyl chloride-based monomers in the presence of a first initiator to form particle nuclei, and the main polymerization step may be a step of performing bulk polymerization of the particle nuclei and second vinyl chloride-based monomers in the presence of a second initiator. Also, the main polymerization step may be performed even in the absence of a second initiator. In this case, the main polymerization step may be performed by residual first initiator remaining in the particle nuclei formed in the preliminary polymerization step. Also, the main polymerization step may be performed additionally using the first vinyl chloride-based monomers unreacted in the preliminary polymerization step in addition to the particle nuclei and second vinyl chloride-based monomers. For example, the particle nuclei formed after the completion of preliminary polymerization and the unreacted vinyl chloride-based monomers may be transferred together to a main polymerization reactor and thus subjected to bulk polymerization with second vinyl chloride-based monomers filled in the main polymerization reactor. In this case, the second vinyl chloride-based monomers may be added to the main polymerization reactor before, after, or when the particle nuclei formed in the preliminary polymerization step and the unreacted monomers are transferred.

The first and second initiators may be the same as or different from each other and may each independently be one or more selected from the group consisting of: diacyl peroxides such as dicumyl peroxide, dipentyl peroxide, di(3,5,5-trimethylhexanoyl)peroxide, dilauroyl peroxide, and the like; peroxycarbonates such as diisopropyl peroxydicarbonate, di-sec-butyl peroxydicarbonate, di(2-ethylhexyl) peroxydicarbonate, and the like; peroxy esters such as t-butyl peroxy neodecanoate, t-butyl peroxy neoheptanoate, t-amyl peroxy neodecanoate, cumyl peroxy neodecanoate, cumyl peroxy neoheptanoate, 1,1,3,3-tetramethylbutyl peroxy neodecanoate, and the like; azo compounds such as azobis-2,4-dimethylvaleronitrile and the like; and sulfates such as potassium persulfate, ammonium persulfate, and the like.

The first and second vinyl chloride-based monomers may be the same as or different from each other and may each independently be a pure vinyl chloride monomer or a monomer mixture including the pure vinyl chloride monomer as a main and a vinyl-based monomer copolymerizable with the pure vinyl chloride monomer. The monomer mixture may include the vinyl-based monomer in an amount of 1 to 50 parts by weight based on 100 parts by weight of the vinyl chloride monomer. The vinyl-based monomer may be one or more selected from the group consisting of: olefin compounds such as ethylene, propylene, and the like; vinyl esters such as vinyl acetate, vinyl propionate, and the like; unsaturated nitriles such as acrylonitrile and the like; vinyl alkyl ethers such as vinyl methyl ether, vinyl ethyl ether, and the like; unsaturated fatty acids such as acrylic acid, methacrylic acid, itaconic acid, maleic acid, and the like; and anhydrides of the fatty acids.

The first initiator may be included in an amount of0.01 to 0.20 parts by weight, specifically 0.03 to 0.15 parts by weight, and more specifically 0.05 to 0.10 parts by weight with respect to 100 parts by weight of the first vinyl chloride-based monomers. When the above-described range is satisfied, process stability in polymerization is excellent.

The second initiator may be included in an amount of 0.03 to 0.60 parts by weight, specifically 0.05 to 0.40 parts by weight, and more specifically 0.08 to 0.30 parts by weight with respect to 100 parts by weight of the sum of the particle nuclei, the first vinyl chloride-based monomers unreacted in the preliminary polymerization step, and the second vinyl chloride-based monomers. When the above-described range is satisfied, process stability in polymerization is excellent.

The bulk polymerization in the preliminary polymerization step may be performed at a temperature of 60° C. to 80° C. and a pressure of9 to 14 kgf/cm$^2$. When the above-described conditions are satisfied, the particle nuclei can be formed from the first vinyl chloride-based monomers. When a polymerization conversion rate reaches 10% to 15%, the first bulk polymerization may be terminated.

The bulk polymerization in the main polymerization step may be performed at a temperature of 50° C. to 70° C. and a pressure of 7 to 12 kgf/cm$^2$. When the above-described conditions are satisfied, the particle nuclei can be allowed to grow to form a vinyl chloride-based polymer.

Meanwhile, the polyvinyl alcohol may be added in any one step of the first step and the second step or in both the first step and the second step. Specifically, when added in the first step, the polyvinyl alcohol may be added in at least one step of the preliminary polymerization step (step 1-1) and the main polymerization step (step 1-2). In addition, in the preliminary polymerization step, the polyvinyl alcohol may be added before the initiation of bulk polymerization or during bulk polymerization. In the main polymerization step, the polyvinyl alcohol may be added before the initiation of bulk polymerization, during bulk polymerization, or after the completion of bulk polymerization. More specifically, in the preliminary polymerization step, the polyvinyl alcohol may be added before the initiation of bulk polymerization, and in the main polymerization step, the polyvinyl alcohol may be added before the initiation of bulk polymerization or after the completion of polymerization, that is, in the second step. The polyvinyl alcohol may be added while maintaining stirring, or stirring may be performed after the addition of the polyvinyl alcohol.

In addition, when added in the second step, the polyvinyl alcohol may be added, specifically, after the recovery of unreacted vinyl chloride-based monomers, and more specifically, before a post-treatment process for removing unreacted vinyl chloride-based monomers still remaining after unreacted vinyl chloride-based monomers are recovered after the completion of polymerization. In the bulk polymerization process, a post-treatment process of secondarily removing a small amount of unreacted monomer that is not recovered and still remains after the separation and recovery of unreacted vinyl chloride-based monomers may be performed. In this case, the preceding separation and recovery processes may be performed under any conditions that are typically used, for example, under room temperature (20±5° C.) and vacuum conditions, and the post-treatment process of removing unreacted monomers may be performed by thermal treatment under 70 to 90° C. and vacuum conditions, specifically, at a pressure of −0.2 kgf/cm$^2$ to −0.8 kgf/$cm^2$. Since a vinyl chloride-based polymer or vinyl chloride-based polymer composite polymerized by heat applied in the post-treatment process may be damaged due to heat, polyvinyl alcohol may be added before a post-treatment process (thermal treatment process) to protect the vinyl chloride-based polymer or vinyl chloride-based polymer composite from heat. That is, the second step of the present invention may further include a post-treatment process of thermally treating a vinyl chloride-based polymer composite after the recovery of unreacted vinyl chloride-based monomers. In addition, when added in the second step, the polyvinyl alcohol may be added after the recovery of unreacted vinyl chloride-based monomers and before the post-treatment process.

When the polyvinyl alcohol is added in the above-described step, the thermal damage to a vinyl chloride-based polymer, which may occur due to the heat unexpectedly generated in the bulk polymerization process in which temperature control is difficult, may be prevented. Also, the thermal damage to a vinyl chloride-based polymer, which occurs due to heat applied in the post-treatment process for removing unreacted vinyl chloride-based monomers, may be prevented. The vinyl chloride-based polymer prepared while being protected from heat may exhibit excellent thermal stability even when used as a product after the preparation. In addition, the polyvinyl alcohol may suppress side reactions resulting from an initiator, which may occur in the bulk polymerization process in each of the preliminary polymerization step and the main polymerization step. Accordingly, coloration caused by the side reactions may be minimized, and thus the color quality and transparency of a vinyl chloride-based polymer which is a final product may be enhanced. In addition, since the processing of a product using a vinyl chloride-based polymer is performed at high temperatures, it is very important to ensure excellent color quality, transparency, and thermal stability. When the polyvinyl alcohol is included during or after the polymerization of the vinyl chloride-based polymer, the polyvinyl alcohol may be dispersed while reaching the base material of the vinyl chloride-based polymer and may be both physically and chemically adsorbed onto the vinyl chloride-based polymer. Accordingly, a product processed using a composition including a vinyl chloride-based polymer composite, in which polyvinyl alcohol is adsorbed onto a vinyl chloride-based polymer according to the preparation method of the present invention, may exhibit remarkable excellent transparency and thermal stability, as compared to a product processed using a composition independently including each component by separately adding a vinyl chloride-based polymer and polyvinyl alcohol in compounding of the composition.

The polyvinyl alcohol may be added in an amount of 0.003 to 0.500 parts by weight, specifically 0.005 parts by weight to 0.500 parts by weight, and more specifically 0.200 to 0.500 parts by weight with respect to 100 parts by weight of the sum of the first and second vinyl chloride-based monomers. When the above-described range is satisfied, the thermal damage to a vinyl chloride-based polymer, which may occur due to the heat unexpectedly generated in the bulk polymerization process and due to the thermal treatment process for removing unreacted vinyl chloride-based monomers, can be minimized. Also, side reactions resulting from the first and second initiators, which may occur in the bulk polymerization process, can be suppressed to minimize coloration caused by the side reactions, and thus the color quality and transparency of a vinyl chloride-based polymer which is a final product can be enhanced. When the polyvinyl alcohol is added in an amount of less than 0.003 parts by weight, an effect of improving thermal stability and transparency may be hardly exhibited due to an amount insufficient to prevent the thermal damage to a vinyl chloride-based polymer in the bulk polymerization process and post-treatment process. On the other hand, when polyvinyl alcohol is added in an excessive amount of more than 0.500 parts by weight, the particle size of a vinyl chloride-based polymer may uncontrollably increase (formation of oversized particle) due to the intrinsic viscosity and high adsorbability (property of being adsorbed) of polyvinyl alcohol, and the agglomeration of a polymer (lump phenomenon) may frequently occur. When many oversized particles are formed in a polymer and many lumps are produced due to the lump phenomenon, a yield of obtaining a normal vinyl chloride-based polymer composite may be substantially decreased, the thermal stability and transparency of the entire polymer composite may be degraded due to abnormal particles and lumps, and a large amount of scale may be formed in a polymerization reactor. In this case, the yield of obtaining a normal vinyl chloride-based polymer composite may be determined, for example, based on the amount of a vinyl chloride-based polymer composite obtained by filtration through a screen mesh, and the scale of the screen mesh may be 30 to 40 mesh, and specifically, 35 mesh. The vinyl chloride-based polymer composite according to the present invention exhibits a high yield (the amount of a vinyl chloride-based polymer composite obtained by filtration through the screen mesh with the scale is about 95 wt %, and specifically, 95 wt % or more), but when polyvinyl alcohol is included in an excessive amount of more than 0.500 parts by weight, a yield may greatly decrease to about less than 90 wt %. A low yield of less than 90 wt % may be regarded as an industrially unusable level.

In addition, the polyvinyl alcohol in the present invention is an additive that serves as a thermal stabilizer included to prevent the thermal deformation of a vinyl chloride-based polymer due to heat generated in the polymerization of a vinyl chloride-based polymer and deformation caused by heat applied in the post-treatment process for removing unreacted vinyl chloride-based monomers, and is different from polyvinyl alcohol used as a dispersant in a suspension polymerization method of a vinyl chloride-based polymer. Unlike the polyvinyl alcohol of the present invention, which serves as a thermal stabilizer to improve the thermal stability and transparency of the prepared vinyl chloride-based polymer composite, polyvinyl alcohol used in a suspension polymerization method is added before the initiation of polymerization or at the beginning of polymerization to aid the formation of a droplet in a reaction mixture including vinyl chloride-based monomers, and thus increases the dispersibility of vinyl chloride-based monomers and initial vinyl chloride-based polymer particles in a polymerization solvent. Accordingly, the size and porosity of the prepared polymer particles, particularly, initial polymer particles, are controlled to prevent the formation of coarse polymer particles, and thus degradation of properties of a polymer, such as viscosity, processability, and the like, is prevented.

As described above, polyvinyl alcohol added in suspension polymerization is intended to increase the dispersibility of vinyl chloride-based monomers and initial vinyl chloride-based polymer particles in a polymerization solvent, and the polyvinyl alcohol added in bulk polymerization according to the embodiment of the present invention is intended to protect a vinyl chloride-based polymer from heat generation whose control is difficult as polymerization is performed without a polymerization solvent and/or heat applied in the post-treatment process performed after the recovery of unreacted monomers, so the purpose of the addition in two cases is different. Also, since the purpose and effect of the addition are different as described above, an addition amount also needs to vary.

In addition, according to the embodiment of the present invention, the polyvinyl alcohol may have a degree of hydrolysis of 30 mol % to 99 mol %, preferably 40 mol % to 99 mol % or 80 mol % to 99 mol %, and more preferably 90 mol % to 99 mol % or 95 mol % to 99 mol %. When the degree of hydrolysis of polyvinyl alcohol satisfies the above-described range, a rate of additional hydrolysis of polyvinyl alcohol in the preparation process of a vinyl chloride-based polymer composite can be lowered, and thus the thermal stability and transparency of the prepared vinyl chloride-based polymer composite can be improved. Particularly, when the degree of hydrolysis is 90 mol % or more, since the degree of hydrolysis of polyvinyl alcohol is already sufficiently high, a rate of hydrolysis of polyvinyl alcohol, which occurs during the preparation process of a vinyl chloride-based polymer composite, can be substantially lowered, and accordingly, thermal stability and transparency can be substantially improved. When the hydrolysis of polyvinyl alcohol occurs during the polymerization process of a vinyl chloride-based polymer, it becomes difficult to control the particle size of a vinyl chloride-based polymer, and thus many vinyl chloride-based polymer particles with an undesired size may be formed, leading to degradation of thermal stability and transparency.

In the present invention, the degree of hydrolysis of polyvinyl alcohol may represent a degree of hydrolysis when polyvinyl alcohol is formed through hydrolysis by allowing a vinyl ester-based polymer to come in contact with an alkali material, that is, a degree at which hydroxyl groups are bound in a polymer.

The polyvinyl alcohol according to the embodiment of the present invention may be obtained from various vinyl ester compounds such as straight-chain or branched saturated vinyl esters known in the art (e.g., vinyl formate, vinyl acetate, vinyl propionate, vinyl butyrate, vinyl pivalate, vinyl versatate, and the like). A mixture of two or more of the vinyl ester compounds or a mixture of vinyl ester and other comonomers may also be used. For example, the polyvinyl alcohol may be obtained from polyvinyl acetate formed by polymerizing vinyl acetate monomers (VAMs) or a monomer mixture including VAMs. That is, the polyvinyl alcohol may be formed by polymerizing or copolymerizing a vinyl ester compound. The vinyl ester polymer thus obtained may be partially hydrolyzed to form polyvinyl alcohol. Then, the obtained polyvinyl alcohol may be used as it is in the polymerization process of the present invention and, if necessary, may be used after the obtained polyvinyl alcohol is treated to introduce a polyene group (conjugated double bond) into the main chain of a polymer.

In addition, the vinyl ester polymer obtained by polymerizing or copolymerizing the vinyl ester compound may include a partial double bond derived from the vinyl ester compound (monomer), and this double bond may be included even after hydrolysis is performed to form polyvinyl alcohol. Also, the double bond portion acts as a reaction site with a vinyl chloride-based monomer or vinyl chloride-based polymer, and thus the polyvinyl alcohol and the vinyl chloride-based monomer or vinyl chloride-based polymer may form a chemical bond.

Here, hydrolysis may be performed, for example, through transesterification or direct hydrolysis by allowing the vinyl ester polymer to be in contact with an alkali material. A hydrolysis temperature may range from about 10° C. to about 70° C., for example, from about 20° C. to about 50° C. As the alkali material useful in the embodiment of the present invention, alkali metal hydroxides such as potassium hydroxide, sodium hydroxide, lithium hydroxide, and the like; and alkali metal alcoholates such as sodium methoxide, sodium ethoxide, potassium methoxide, potassium ethoxide, potassium t-butoxide, and the like may be used. For example, saponification may be performed by allowing the vinyl ester polymer to be in contact with the above-described alkali material.

In addition, as a solvent useful in performing hydrolysis, alcohols such as methanol, ethanol, isopropyl alcohol, n-propyl alcohol, n-butanol, isobutanol, sec-butanol, t-butanol, amyl alcohol, cyclohexanol, and the like; cyclic ethers such as tetrahydrofuran, dioxane, and the like; ketones such as acetone, methyl ethyl ketone, methyl isobutyl ketone, pinacolin, and the like; sulfoxides such as dimethyl sulfoxide and the like; hydrocarbons such as toluene, benzene, n-hexane, cyclohexane, and the like; and a mixture thereof may be used, and a compound that allows the vinyl ester polymer and/or polyvinyl alcohol obtained through partial hydrolysis to swell or dissolve may also be used.

Then, the saponified polyvinyl alcohol may be isolated and further processed. For example, an alkali material remaining in a composition may be neutralized, and a polymer may be washed and dried, thereby obtaining purified polyvinyl alcohol. An isolation method may be determined by the solubility of the obtained polyvinyl alcohol in a solvent and may include anti-solvent precipitation, drying, or a combination thereof.

According to the embodiment of the present invention, the polyvinyl alcohol may have a viscosity of 3 to 80 pa·s, preferably 5 to 70 pa·s, and more preferably 6 to 60 pa·s, as measured at 20° C. in a 4 wt % aqueous solution. Also, the polyvinyl alcohol may have a degree of polymerization of 200 to 3,500, preferably 500 to 3,000, and more preferably 600 to 2,500. When the above-described viscosity and/or polymerization degree ranges are satisfied, the polyvinyl alcohol can have a viscosity and a degree of polymerization which are appropriate for forming a vinyl chloride-based polymer composite, and thus the dispersibility of polyvinyl alcohol in the base material of a vinyl chloride-based polymer can further increase, resulting in improvement of the color quality of a vinyl chloride-based polymer composite. In addition, since the polyvinyl alcohol that participates in the polymerization process and/or post-treatment process has relatively low pH sensitivity, the hydrolysis of polyvinyl alcohol is less likely to occur during the preparation process of a vinyl chloride-based polymer composite, and thus the thermal stability of a vinyl chloride-based polymer composite can be improved. Additionally, when the above-described viscosity and polymerization degree ranges are satisfied, the enlargement of vinyl chloride-based polymer particles and the agglomeration of a polymer (lump phenomenon), which are caused by the intrinsic viscosity and adsorbability of polyvinyl alcohol, can be further suppressed. Accordingly, the quality of the prepared vinyl chloride-based polymer, such as thermal stability and transparency, can be improved, and the formation of scale in a polymerization reactor can be suppressed.

In addition, according to the embodiment of the present invention, the polyvinyl alcohol may have a number-average molecular weight of 100 to 100,000 g/mol, preferably 500 to 80,000 g/mol, and more preferably 1,000 to 50,000 g/mol. The number-average molecular weight may be within the range that may be derived when the viscosity and degree of polymerization of polyvinyl alcohol satisfy the above-described ranges.

Additionally, according to the embodiment of the present invention, the vinyl chloride-based polymer included in the vinyl chloride-based polymer composite may have a number-average molecular weight of 100 to 100,000 g/mol, preferably 500 to 80,000 g/mol, and more preferably 1,000 to 50,000 g/mol. Also, the vinyl chloride-based polymer may have a degree of polymerization of 200 to 3,500, preferably 500 to 3,000, and more preferably 600 to 2,500.

The polyvinyl alcohol may be added in a solid state or in an aqueous solution in which the polyvinyl alcohol is mixed in an aqueous solvent. For example, the polyvinyl alcohol added before the initiation of bulk polymerization in the preliminary polymerization step or main polymerization step may be added in a solid state. When the polyvinyl alcohol in a solid state is added, the enlargement of polymer particles and the agglomeration of a polymer (lump phenomenon) during the polymerization process may be suppressed. When the polyvinyl alcohol is added in the second step after the completion of polymerization, at least one of polyvinyl alcohol in a solid state and polyvinyl alcohol in an aqueous solution may be added. In this case, the polyvinyl alcohol may be included in an amount of 1 to 10 wt %, specifically 1 to 7 wt/o, and more specifically 3 to 5 wt % with respect to the total weight of the aqueous solution. When the polyvinyl alcohol in an aqueous solution is added in the above-described amount, the polyvinyl alcohol can be more uniformly dispersed in a vinyl chloride-based polymer, and thus the thermal stability, color quality, and transparency of a vinyl chloride-based polymer composite which is a final product can be enhanced. Also, when stirring is performed after the addition of polyvinyl alcohol, the polyvinyl alcohol may be more uniformly dispersed in one or more selected from the group consisting of the first vinyl chloride-based monomers and the second vinyl chloride-based monomers or in the previously prepared vinyl chloride-based polymer.

The method of preparing a vinyl chloride-based polymer according to the first embodiment of the present invention may include a second step of recovering unreacted vinyl chloride-based monomers after the completion of the bulk polymerization and obtaining a vinyl chloride-based polymer composite.

In the second step, when a bulk polymerization conversion rate reaches 50 to 70%, the bulk polymerization may be terminated and a reaction terminator may be input to terminate the bulk polymerization.

The reaction terminator is a substance that terminates a reaction by allowing the function of the second initiator and/or the first initiator included in the particle nucleus to be lost, and may be one or more selected from the group consisting of a phenol compound, an amine compound, a nitrile compound, and a sulfur compound. The phenol compound may be one or more selected from the group consisting of triethylene glycol-bis-3-(3-t-butyl-4-hydroxy-5-methylphenyl)propionate, hydroquinone, p-methoxy phenol, t-butyl-4-hydroxyanisole, n-octadecyl-3-(4-hydroxy-3, 5-di-t-butylphenyl)propionate, 2,5-di-t-butyl hydroquinone, 4,4'-butylidene bis(3-methyl-t-butyl phenol), t-butyl catechol, 4,4-thiobis(6-t-butyl-m-cresol), and tocopherol. The amine compound may be one or more selected from the group consisting of N,N-diphenyl-p-phenylenediamine and 4,4-bis(dimethylbenzyl)diphenyl. The nitrile compound may be 4-hydroxy-2,2,6,6-tetramethyl-piperidine-1-oxyl. The sulfur compound may be one or more selected from the group consisting of dodecyl mercaptan and 1,2-biphenyl-2-thiol.

When the reaction terminator is input, if necessary, an additive such as an antioxidant and the like may be added. The antioxidant may be added to make the color of a vinyl chloride-based polymer turn white.

When the polyvinyl alcohol is added in the second step, a specific addition timing and addition amount are the same as described above.

2. Vinyl Chloride-Based Polymer Composite

A vinyl chloride-based polymer composite according to an embodiment of the present invention includes a vinyl chloride-based polymer and polyvinyl alcohol adsorbed onto the vinyl chloride-based polymer, wherein the polyvinyl alcohol is included in an amount of 0.003 parts by weight to 0.800 parts by weight based on 100 parts by weight of the vinyl chloride-based polymer.

In addition, the vinyl chloride-based polymer composite according to the present invention may be prepared by the above-described method of preparing a vinyl chloride-based polymer composite, and the characteristics of polyvinyl alcohol included in the composite have been described above.

According to the embodiment of the present invention, the polyvinyl alcohol may be included in an amount of 0.003 parts by weight to 0.800 parts by weight, preferably 0.006 parts by weight to 0.600 parts by weight, and more preferably 0.250 parts by weight to 0.550 parts by weight based on 100 parts by weight of the vinyl chloride-based polymer. The polyvinyl alcohol is hardly lost in the preparation process of the vinyl chloride-based polymer composite, and, specifically, 80 to 100% of the polyvinyl alcohol added in the method of preparing a vinyl chloride-based polymer composite may be included in the polymer. Considering the loss rate of polyvinyl alcohol and the polymerization conversion rate of a vinyl chloride-based polymer, the polyvinyl alcohol may be included in the above-described range with respect to the total weight (100 parts by weight) of the vinyl chloride-based polymer composite. When the above-described range is satisfied, a vinyl chloride-based polymer composite which is excellent in all of thermal stability, color quality, and transparency without degrading the performance of the vinyl chloride-based polymer composite can be provided.

In addition, the vinyl chloride-based polymer composite may have a particle non-uniformity of 10 or less, preferably 5 or less, and more preferably 4 or less, as defined by the following Equation 1.

$$\text{Particle non-uniformity } [E(X)] = \frac{1}{50}\sum_{i=1}^{50} X_i \qquad \text{[Equation 1]}$$

In Equation 1, $X_i$ represents the standard deviation of the $i^{th}$ particle and is a value defined by the following Equation 2, $$X_i \text{ (Standard deviation)} = \sqrt{\frac{\sum_{n=1}^{50} (A_n - 100)^2}{50}} \qquad \text{[Equation 2]}$$

In Equation 2, $A_n$ represents the correction for the $n^{th}$ measured diameter of the $i^{th}$ particle, and the correction is a value defined by the following Equation 3, $$A_n \text{ (Correction)} = 100\frac{D_n}{D_0} \quad \text{[Equation 3]}$$

In Equation 3, $D_n$ represents the $n^{th}$ measured diameter of the $i^{th}$ particle, $D_0$ represents the longest diameter of the $i^{th}$ particle, and n is an integer ranging from 1 to 50.

Generally, a vinyl chloride-based polymer prepared by bulk polymerization has a smooth and angled particle surface, and a vinyl chloride-based polymer prepared by suspension polymerization has an uneven particle surface. Accordingly, a vinyl chloride-based polymer prepared by suspension polymerization may typically have a particle non-uniformity exceeding 10. Therefore, the range of the above-described particle non-uniformity of the present invention is distinguished from that of the particle non-uniformity of a vinyl chloride-based polymer prepared by suspension polymerization, and the fact that the vinyl chloride-based polymer in the vinyl chloride-based polymer composite according to the present invention is a vinyl chloride-based polymer prepared by bulk polymerization may be confirmed through particle non-uniformity.

3. Vinyl Chloride-Based Polymer Composite Composition

A vinyl chloride-based polymer composite composition according to an embodiment of the present invention includes the above-described vinyl chloride-based polymer composite and one or two or more selected from the group consisting of a stabilizer, a processing aid, an impact modifier, and a lubricant. Also, the vinyl chloride-based polymer composite in the vinyl chloride-based polymer composite composition may be the above-described vinyl chloride-based polymer composite prepared according to the above-described method of preparing a vinyl chloride-based polymer composite.

The stabilizer is a substance that prevents coloration and decomposition by increasing stability against heat and may be a metal-based stabilizer or an organic acid metal salt stabilizer. The metal-based stabilizer may be one or two or more selected from the group consisting of a lead-based stabilizer, a (organic) tin-based stabilizer, a cadmium-based stabilizer, and a barium-based stabilizer. The organic acid metal salt stabilizer may be a stabilizer based on a metal salt of a carboxylic acid, organophosphate, or phenol. The carboxylic acid may be one or two or more selected from the group consisting of caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenyl stearic acid, ricinoleic acid, linoleic acid, linolenic acid, oleic acid, arachic acid, behenic acid, erucic acid, brassidic acid, pseudo-acid, resin fatty acid, palm oil fatty acid, tung oil fatty acid, soybean oil fatty acid, cotton seed oil fatty acid, benzoic acid, p-t-butylbenzoic acid, ethylbenzoic acid, isopropylbenzoic acid, toluic acid, xylic acid, salicylic acid, 5-t-octylsalicylic acid, naphthenic acid, and cyclohexacarboxylic acid. The organophosphate may be one or two or more selected from the group consisting of monooctyl phosphate, dioctyl phosphate, monododecyl phosphate, didodecyl phosphate, monooctadecyl phosphate, dioctadecyl phosphate, mono(nonylphenyl) phosphate, di(nonylphenyl) phosphate, nonylphenyl ester phosphonate, and stearyl ester phosphonate. The phenol may be one or more selected from the group consisting of phenol, cresol, ethylphenol, cyclohexylphenol, nonylphenol, and dodecylphenol. The metal salt may be a neutral salt, an acid salt, a basic salt, or a strong basic complex.

The processing aid is a substance that promotes the gelation of a vinyl chloride-based polymer, and examples thereof include: a homopolymer or copolymer of an alkyl methacrylate such as methyl methacrylate, ethyl methacrylate, butyl methacrylate, and the like; a copolymer of the alkyl methacrylate and an alkyl acrylate such as methyl acrylate, ethyl acrylate, butyl acrylate, and the like; a copolymer of the alkyl methacrylate and an aromatic vinyl compound such as styrene, α-methyl styrene, vinyl toluene, and the like; a copolymer of the alkyl methacrylate and a vinyl cyanide compound such as acrylonitrile, methacrylonitrile, and the like; and the like, which may be used alone or in combination of two or more thereof.

The impact modifier is a substance that reinforces impact resistance by imparting elasticity to a vinyl chloride-based polymer and may be one or more selected from the group consisting of a methyl methacrylate-butadiene-styrene (MBS)-based polymer, a chlorinated polyethylene-based copolymer, an ethylene-vinyl acetate-based polymer, an acrylic polymer, and a butadiene-based polymer.

The lubricant is a substance that enhances the processability and interfacial properties of a vinyl chloride-based polymer, and examples thereof include: a hydrocarbon-based lubricant such as low molecular weight wax, paraffin wax, polyethylene wax, chlorinated hydrocarbon, fluorocarbon, and the like; a natural wax-based lubricant such as carnauba wax, candelilla wax, and the like; a fatty acid-based lubricant such as a higher fatty acid (e.g., lauric acid, stearic acid, behenic acid, and the like), an oxy fatty acid (e.g., hydroxy stearic acid), and the like; an aliphatic amide-based lubricant such as an aliphatic amide compound (e.g., stearyl amide, lauryl amide, oleyl amide, and the like), an alkylene bis aliphatic amide (e.g., methylene bis stearyl amide and ethylene bis stearyl amide), and the like; a fatty acid alcohol ester-based lubricant such as a fatty acid monohydric alcohol ester compound (e.g., stearyl stearate, butyl stearate, distearyl phthalate, and the like), a fatty acid polyhydric alcohol ester compound (e.g., glycerin tristearate, sorbitan tristearate, pentaerythritol tetrastearate, dipentaerythritol hexastearate, polyglycerin polyricinoleate, hydrogenated castor oil, and the like), a mono fatty acid (e.g., an adipic acid stearic acid ester of dipentaerythritol), and a composite ester compound of polybasic organic acid and polyhydric alcohol, and the like; an aliphatic alcohol-based lubricant such as stearyl alcohol, lauryl alcohol, palmityl alcohol, and the like; a metallic soap; a montanic acid-based lubricant such as a partially saponified montanic acid ester and the like; an acrylic lubricant; silicone oil; and the like, which may be used alone or in combination of two or more thereof.

Hereinafter, exemplary embodiments of the present invention will be described in order to aid in understanding the present invention. However, it is apparent to those skilled in the art that the following embodiments are merely presented to exemplify the present invention, and various changes and modifications can be made to the exemplary embodiments of the present invention without departing from the scope and spirit of the present invention, so that the present invention covers all such changes and modifications provided they are within the scope of the appended claims.

Example 1

Vinyl chloride-based monomers were polymerized using a polymerization device including a preliminary polymerization reactor with a volume of 0.2 $m^3$, a main polymerization reactor with a volume of 0.5 $m^3$, a reflux condenser connected to the main polymerization reactor and controlling a polymerization temperature, and a vinyl chloride recovery tube connected to the reflux condenser and discharging unreacted vinyl chloride-based monomers as follows.

140 kg of vinyl chloride monomers and 85 g of t-butyl peroxy neodecanoate were sequentially input into a preliminary polymerization reactor, which had been degassed so as to be a high vacuum, and then 11 g of polyvinyl alcohol (degree of hydrolysis: 40 mol %) was input, followed by stirring. While maintaining the stirring, the pressure inside the preliminary polymerization reactor was raised to 12 kgf/$cm^2$, and bulk polymerization was performed to prepare particle nuclei. In this case, a polymerization conversion rate was 10%.

Subsequently, 80 kg of vinyl chloride monomers was input into a main polymerization reactor, the whole quantity of the particle nuclei prepared in the preliminary polymerization reactor was transferred to the main polymerization reactor, and then 200 g of 1,1,3,3-tetramethylbutyl peroxy neodecanoate was input, followed by stirring. While maintaining the stirring, bulk polymerization was performed at a pressure of 7.5 kgf/$cm^2$ for 200 minutes. When a polymerization conversion rate reached 60%, 15 g of 4-hydroxy-2,2,6,6-tetramethyl-piperidine-1-oxyl and 100 g of triethylene glycol-bis-3-(3-t-butyl-4-hydroxy-5-methylphenyl)propionate were input, and remaining unreacted monomers were recovered under vacuum while maintaining stirring. Then, thermal treatment was performed at 80±5° C. to remove vinyl chloride monomers that were not recovered and still remained in a polymer composite even after the recovery, thereby obtaining a vinyl chloride polymer composite.

Examples 2 to 6 and Comparative Examples 1 to 3

Vinyl chloride polymer composites were prepared in the same manner as in Example 1, except that polyvinyl alcohol or tetrasodium diphosphate shown in Tables 1 and 2 below was input instead of 11 g of polyvinyl alcohol (degree of hydrolysis: 40 mol %).

Example 7

Vinyl chloride-based monomers were polymerized using a polymerization device including a preliminary polymerization reactor with a volume of 0.2 $m^3$, a main polymerization reactor with a volume of 0.5 $m^3$, a reflux condenser connected to the main polymerization reactor and controlling a polymerization temperature, and a vinyl chloride recovery tube connected to the reflux condenser and discharging unreacted vinyl chloride-based monomers as follows.

140 kg of vinyl chloride monomers and 85 g of t-butyl peroxy neodecanoate were sequentially input into a preliminary polymerization reactor, which had been degassed so as to be a high vacuum, and stirred. While maintaining the stirring, the pressure inside the preliminary polymerization reactor was raised to 12 kgf/$cm^2$, and bulk polymerization was performed to prepare particle nuclei. In this case, a polymerization conversion rate was 10%.

Subsequently, 80 kg of vinyl chloride monomers was input into a main polymerization reactor, the whole quantity of the particle nuclei prepared in the preliminary polymerization reactor was transferred to the main polymerization reactor, and then 200 g of 1,1,3,3-tetramethylbutyl peroxy neodecanoate and 11 g of polyvinyl alcohol (degree of hydrolysis: 40 mol %) were sequentially input, followed by stirring. While maintaining the stirring, bulk polymerization was performed at a pressure of 7.5 kgf/$cm^2$ for 200 minutes. When a polymerization conversion rate reached 60%, 15 g of 4-hydroxy-2,2,6,6-tetramethyl-piperidine-1-oxyl and 100 g of triethylene glycol-bis-3-(3-t-butyl-4-hydroxy-5-methylphenyl)propionate were input, and remaining unreacted monomers were recovered under vacuum while maintaining stirring. Then, thermal treatment was performed at 80±5° C. to remove vinyl chloride monomers that were not recovered and still remained in a polymer composite even after the recovery, thereby obtaining a vinyl chloride polymer composite.

Examples 8 to 13 and Comparative Examples 4 to 6

Vinyl chloride polymer composites were prepared in the same manner as in Example 7, except that polyvinyl alcohol or tetrasodium diphosphate shown in Tables 3 and 4 below was input instead of 11 g of polyvinyl alcohol (degree of hydrolysis: 40 mol %).

Example 14

Vinyl chloride-based monomers were polymerized using a polymerization device including a preliminary polymerization reactor with a volume of 0.2 $m^3$, a main polymerization reactor with a volume of 0.5 $m^3$, a reflux condenser connected to the main polymerization reactor and controlling a polymerization temperature, and a vinyl chloride recovery tube connected to the reflux condenser and discharging unreacted vinyl chloride-based monomers as follows.

140 kg of vinyl chloride monomers and 85 g of t-butyl peroxy neodecanoate were sequentially input into a preliminary polymerization reactor, which had been degassed so as to be a high vacuum, and stirred. While maintaining the stirring, the pressure inside the preliminary polymerization reactor was raised to 12 kgf/$cm^2$, and bulk polymerization was performed to prepare particle nuclei. In this case, a polymerization conversion rate was 10%.

Subsequently, 80 kg of vinyl chloride monomers was input into a main polymerization reactor, the whole quantity of the particle nuclei prepared in the preliminary polymerization reactor was transferred to the main polymerization reactor, and then 200 g of 1,1,3,3-tetramethylbutyl peroxy neodecanoate was input, followed by stirring. While maintaining the stirring, bulk polymerization was performed at a pressure of 7.5 kgf/$cm^2$ for 200 minutes. When a polymerization conversion rate reached 60%, 15 g of 4-hydroxy-2,2,6,6-tetramethyl-piperidine-1-oxyl and 100 g of triethylene glycol-bis-3-(3-t-butyl-4-hydroxy-5-methylphenyl)propionate were input, remaining unreacted monomers were recovered under vacuum while maintaining stirring, and 33 g of polyvinyl alcohol (degree of hydrolysis: 40 mol %) was input, followed by stirring. Then, thermal treatment was performed at 80±5° C. to remove vinyl chloride monomers that were not recovered and still remained in a polymer composite, thereby obtaining a vinyl chloride polymer composite.

Examples 15 to 18 and Comparative Examples 7 and 8

Vinyl chloride polymer composites were prepared in the same manner as in Example 7, except that polyvinyl alcohol or tetrasodium diphosphate shown in Tables 5 and 6 below was input instead of 11 g of polyvinyl alcohol (degree of hydrolysis: 40 mol %).

Comparative Example 9

Vinyl chloride-based monomers were polymerized using a polymerization device including a preliminary polymerization reactor with a volume of 0.2 $m^3$, a main polymerization reactor with a volume of 0.5 $m^3$, a reflux condenser connected to the main polymerization reactor and controlling a polymerization temperature, and a vinyl chloride recovery tube connected to the reflux condenser and discharging unreacted vinyl chloride-based monomers as follows.

140 kg of vinyl chloride monomers and 85 g of t-butyl peroxy neodecanoate were sequentially input into a preliminary polymerization reactor, which had been degassed so as to be a high vacuum, and stirred. While maintaining the stirring, the pressure inside the preliminary polymerization reactor was raised to 12 kgf/$cm^2$, and bulk polymerization was performed to prepare particle nuclei. In this case, a polymerization conversion rate was 10%.

Subsequently, 80 kg of vinyl chloride monomers was input into a main polymerization reactor, the whole quantity of the particle nuclei prepared in the preliminary polymerization reactor was transferred to the main polymerization reactor, and then 200 g of 1,1,3,3-tetramethylbutyl peroxy neodecanoate was input, followed by stirring. While maintaining the stirring, bulk polymerization was performed at a pressure of 7.5 kgf/$cm^2$ for 200 minutes. When a polymerization conversion rate reached 60%, 200 g of butylated hydroxytoluene was input, and remaining unreacted monomers were recovered under vacuum while maintaining stirring. Then, thermal treatment was performed at 80±5° C. to remove vinyl chloride monomers that were not recovered and still remained in a polymer even after the recovery, thereby obtaining a vinyl chloride polymer.

Comparative Example 10

A vinyl chloride polymer was prepared in the same manner as in Comparative Example 9, except that di-2-ethylhexyl peroxydicarbonate instead of t-butyl peroxy neodecanoate was input into a preliminary polymerization reactor.

Comparative Example 11 kg of deionized water, 3,750 g of a polyvinyl alcohol aqueous solution (degree of hydrolysis: 78.5 mol %, concentration: 4 wt %), 2,500 g of a polyvinyl alcohol aqueous solution (degree of hydrolysis: 40.7 mol %, concentration: 4 wt %), 1,500 g of a hydroxypropyl methylcellulose aqueous solution (concentration: 2 wt %), and 300 kg of vinyl chloride monomers were input into a reactor equipped with a reflux condenser and having an internal volume of 1 $m^3$. Then, 30 g of di-2-ethylhexyl peroxydicarbonate and 120 g of t-butyl peroxy neodecanoate were input, and polymerization was performed while maintaining a polymerization temperature of 57° C. When the pressure inside the polymerization reactor reached 6.3 kgf/$cm^2$, 15 g of 4-hydroxy-2,2,6,6-tetramethyl-piperidine-1-oxyl and 60 g of triethylene glycol-bis-3-(3-t-butyl-4-hydroxy-5-methylphenyl)propionate were input. Subsequently, unreacted monomers were recovered, and a resin slurry was obtained from the polymerization reactor. The obtained slurry was dried in a fluid bed dryer according to a typical method, thereby obtaining a vinyl chloride polymer composite.

Comparative Example 12

90 kg of deionized water, 45 g of hydroxy-dimethylbutyl peroxy ester, 120 g of polyvinyl alcohol (degree of hydrolysis: 80 mol %), and 80 g of polyvinyl alcohol (degree of hydrolysis: 40 mol %) were input into a preliminary polymerization reactor having an internal volume of 0.2 $m^3$. Then, vacuum was applied to the preliminary polymerization reactor, 75 kg of vinyl chloride monomers was input, and polymerization was performed while raising a polymerization temperature to 62° C. to prepare particle nuclei. In this case, a polymerization conversion rate was 13%.

360 kg of deionized water, 60 g of cumyl peroxy dicarbonate, and 120 g of t-butyl peroxy neodecanoate were input into a reactor (main polymerization reactor) equipped with a reflux condenser and having an internal volume of 1 $m^3$. Then, 300 g of polyvinyl alcohol (degree of hydrolysis: 80 mol %), 250 g of polyvinyl alcohol (degree of hydrolysis: 40 mol %), and 30 g of hydroxypropyl methylcellulose (hydroxypropyl group: 10 wt %, viscosity measured at 23° C. in a 2 wt % aqueous solution: 100 cps) were input, vacuum was applied to the reactor, and then 300 kg of vinyl chloride monomers was input.

Subsequently, the obtained particle nuclei and unreacted monomers were input into the main polymerization reactor, and polymerization was performed while controlling a polymerization temperature to be 57° C. throughout the polymerization. When the pressure inside the main polymerization reactor reached 6.5 kgf/$cm^2$, 60 g of triethylene glycol-bis-3-(3-t-butyl-4-hydroxy-5-methylphenyl)propionate was input. Then, unreacted monomers were recovered, and a polymer slurry was obtained from the polymerization reactor. In this case, the final polymerization conversion rate was 84%. The obtained slurry was dried in a fluid bed dryer according to a typical method, thereby obtaining a vinyl chloride polymer composite.

Experimental Example 1: Measurement of Thermal Stability 100 parts by weight of the vinyl chloride polymer or vinyl chloride polymer composite obtained in each of the examples and comparative examples was mixed with 4 parts by weight of a mono, dimethyl tin mercaptide complex as a tin-based stabilizer, 1 part by weight of an acryl and methyl methacrylate (MMA) complex as a processing aid, and 6 parts by weight of a methyl methacrylate (MMA) and butadiene complex as an impact modifier, and the mixture was subjected to roll milling at 185° C. for 3 minutes to prepare a preliminary sheet (thickness: 0.5 mm). The preliminary sheet was cut into a uniform size, and a plurality of the preliminary sheets were stacked so that the total weight of the preliminary sheet was 45 g. The stacked sheets were placed in a framework (thickness: 3 mm) and subjected to a process of pre-heating at 185° C. for 2 minutes, heating at low pressure for 3 minutes, and cooling at high pressure for 2 minutes using a press to prepare a sheet (thickness: 3 mm).

Afterward, a whiteness index (W.I) value was measured using a colorimeter NR-3000 (manufactured by Nippon Denshoku), and results thereof are shown in Tables 1 to 7. In this case, a higher whiteness index value indicates better thermal stability.

Experimental Example 2: Measurement of Resin Whiteness Index and a Value 30 g of the vinyl chloride polymer or vinyl chloride polymer composite according to each of the examples and comparative examples was input into a transparent sample bag, and the sample bag surface at the position to be measured was made flat without wrinkling. A whiteness index (W.I) value and an a value were measured using a colorimeter NR-3000 (manufactured by Nippon Denshoku), and results thereof are shown in Tables 3 to 7. A higher whiteness index value indicates better color quality, and a lower a value indicates better color quality.

Experimental Example 3: Evaluation of Transparency 100 parts by weight of the vinyl chloride polymer or vinyl chloride polymer composite obtained in each of the examples and comparative examples was mixed with 2 parts by weight of a mono, dimethyl tin mercaptide complex as a tin-based stabilizer, 1 part by weight of an acryl and methyl methacrylate (MMA) complex as a processing aid, 5 parts by weight of a methyl methacrylate (MMA) and butadiene complex as an impact modifier, and 0.5 parts by weight of a fatty acid ester and wax complex as a lubricant, and the mixture was subjected to roll milling at 185° C. for 3 minutes to obtain a preliminary sheet (thickness: 0.5 mm). The preliminary sheet was cut into a uniform size, a plurality of the preliminary sheets were stacked so that the total weight of the preliminary sheet was 45 g, and the stacked sheets were compressed through press processing to prepare a 6 mm-thick sheet. The prepared sheet was used as a sample to measure turbidity and transmittance using BYK-Gardner (Model Name: Haze-Gard plus), and results thereof are shown in Tables 1 to 7.

Transmittance: inversely proportion to turbidity, and higher transmittance indicates better transparency.

Turbidity (haze): defined as a percentage of light that passes through the sample relative to initially irradiated beam, and a turbidity value is lower as more light passes through the sample. That is, a lower turbidity value indicates better transparency.

Experimental Example 4: Evaluation of Particle Non-Uniformity

Particle non-uniformity was calculated by measuring the longest diameter of an individual particle for a total of 50 particles among particles observed using an optical microscope for the surface of individual polymer composites or polymers, measuring 50 diameters passing through the center thereof, and substituting the results into the following Equations 1 to 3. That is, the diameter standard deviation of individual particle was calculated by Equations 2 and 3 using the longest diameter for 50 individual particles and 50 diameters passing through the center thereof, and the average of the 50 calculated diameter standard deviations was represented as particle non-uniformity.

$$\text{Particle non-uniformity } [E(X)] = \frac{1}{50}\sum_{i=1}^{50} X_i \quad \text{[Equation 1]}$$

In Equation 1, $X_i$ represents the standard deviation of the $i^{th}$ particle and is a value defined by the following Equation 2, $$X_i \text{ (Standard deviation)} = \sqrt{\frac{\sum_{n=1}^{50}(A_n - 100)^2}{50}} \quad \text{[Equation 2]}$$

In Equation 2, $A_n$ represents the correction for the $n^{th}$ measured diameter of the $i^{th}$ particle, and the correction is a value defined by the following Equation 3, $$A_n \text{ (Correction)} = 100\frac{D_n}{D_0} \quad \text{[Equation 3]}$$

In Equation 3, $D_n$ represents the $n^{th}$ measured diameter of the $i^{th}$ particle, $D_0$ represents the longest diameter of the $i^{th}$ particle, and n is an integer ranging from 1 to 50.

TABLE 1

| Classification | | | Example 1 | Example 2 | Example 3 | Example 4 | Example 5 |
|---|---|---|---|---|---|---|---|
| PVA | Input timing | | Preliminary polymerization | Preliminary polymerization | Preliminary polymerization | Preliminary polymerization | Preliminary polymerization |
| | Degree of hydrolysis (mol %) | | 40 | 80 | 80 | 99 | 99 |
| | Amount | g | 11 | 11 | 110 | 6.6 | 22 |
| | | parts by weight | 0.005 | 0.005 | 0.050 | 0.003 | 0.010 |
| Properties | Thermal stability | | 33.1 | 32.9 | 36.6 | 32.4 | 33.9 |
| | Resin whiteness index | | 90 | 90 | 91 | 89 | 90 |
| | a value | | 0.8 | 0.7 | 0.6 | 0.9 | 0.8 |
| | Transmittance (%) | | 85.1 | 84.9 | 86.4 | 84.5 | 85.2 |
| | Turbidity (%) | | 7.0 | 7.1 | 6.6 | 7.3 | 7.1 |
| | Particle non-uniformity | | 3.58 | 3.58 | 3.69 | 3.67 | 3.60 |

PVA: Polyvinyl alcohol

TABLE 2

| Classification | | | Example 6 | Comparative Example 1 | Comparative Example 2 | Comparative Example 3 |
|---|---|---|---|---|---|---|
| PVA | Input timing | | Preliminary polymerization | Preliminary polymerization | Preliminary polymerization | — |
| | Degree of hydrolysis (mol %) | | 99 | 99 | 99 | — |
| | Amount | g | 1,056 | 5 | 1,200 | 0 |
| | | parts by weight | 0.480 | about 0.002 | about 0.545 | 0 |
| TSDP | Input timing | | — | — | — | Preliminary polymerization |
| | Amount | g | 0 | 0 | 0 | 220 |
| | | parts by weight | 0 | 0 | 0 | 0.100 |
| Properties | Thermal stability | | 40.1 | 23.9 | 26.1 | 25.4 |
| | Resin whiteness index | | 92 | 86 | 87 | 87 |
| | a value | | 0.5 | 1.2 | 1.0 | 1.1 |
| | Transmittance (%) | | 87.3 | 77.8 | 76.5 | 78.7 |
| | Turbidity (%) | | 6.5 | 10.4 | 10.7 | 9.9 |
| | Particle non-uniformity | | 3.62 | 3.55 | 4.05 | 3.81 |

PVA: Polyvinyl alcohol
TSDP: Tetrasodium diphosphate

TABLE 3

| Classification | | | Example 7 | Example 8 | Example 9 | Example 10 | Example 11 |
|---|---|---|---|---|---|---|---|
| PVA | Input timing | | Main polymerization | Main polymerization | Main polymerization | Main polymerization | Main polymerization |
| | Degree of hydrolysis (mol %) | | 40 | 80 | 80 | 99 | 99 |
| | Amount | g | 11 | 110 | 440 | 6.6 | 11 |
| | | parts by weight | 0.005 | 0.050 | 0.200 | 0.003 | 0.005 |
| Properties | Thermal stability | | 33.3 | 36.5 | 39.4 | 32.0 | 32.8 |
| | Resin whiteness index | | 90 | 91 | 92 | 88 | 90 |
| | a value | | 0.8 | 0.5 | 0.4 | 1.0 | 0.5 |
| | Transmittance (%) | | 85.0 | 86.5 | 87.3 | 84.2 | 84.6 |
| | Turbidity (%) | | 7.0 | 6.6 | 6.4 | 7.4 | 7.2 |
| | Particle non-uniformity | | 3.65 | 4.12 | 3.84 | 3.65 | 3.61 |

PVA: Polyvinyl alcohol

TABLE 4

| Classification | | | Example 12 | Example 13 | Comparative Example 4 | Comparative Example 5 | Comparative Example 6 |
|---|---|---|---|---|---|---|---|
| PVA | Input timing | | Main polymerization | Main polymerization | Main polymerization | Main polymerization | Main polymerization |
| | Degree of hydrolysis (mol %) | | 99 | 99 | 99 | 99 | — |
| | Amount | g | 22 | 1,056 | 4.4 | 1,200 | 0 |
| | | parts by weight | 0.010 | 0.480 | 0.002 | 0.545 | 0 |

TABLE 4-continued

| Classification | | | Example 12 | Example 13 | Comparative Example 4 | Comparative Example 5 | Comparative Example 6 |
|---|---|---|---|---|---|---|---|
| TSDP | Input timing | | — | — | — | — | Main polymerization |
| | Amount | g | 0 | 0 | 0 | 0 | 220 |
| | | parts by weight | 0 | 0 | 0 | 0 | 0.100 |
| Properties | Thermal stability | | 33.8 | 40.2 | 24.1 | 25.8 | 25.6 |
| | Resin whiteness index | | 90 | 92 | 86 | 87 | 87 |
| | a value | | 0.6 | 0.4 | 1.2 | 1.0 | 1.1 |
| | Transmittance (%) | | 85.1 | 87.6 | 77.9 | 76.3 | 78.9 |
| | Turbidity (%) | | 7.1 | 6.3 | 10.3 | 10.7 | 9.8 |
| | Particle non-uniformity | | 3.63 | 3.72 | 3.64 | 4.11 | 3.75 |

PVA: Polyvinyl alcohol
TSDP: Tetrasodium diphosphate

TABLE 5

| Classification | | | Example 14 | Example 15 | Example 16 | Example 17 |
|---|---|---|---|---|---|---|
| PVA | Input timing | | After the termination of polymerization | After the termination of polymerization | After the termination of polymerization | After the termination of polymerization |
| | Degreeof hydrolysis (mol %) | | 40 | 88 | 99 | 99 |
| | Amount | g | 33 | 33 | 6.6 | 22 |
| | | parts by weight | 0.015 | 0.015 | 0.003 | 0.010 |
| Properties | Thermal stability | | 33.6 | 33.8 | 32.1 | 34.0 |
| | Resin whiteness index | | 86 | 87 | 89 | 90 |
| | a value | | 1.3 | 1.1 | 0.9 | 0.7 |
| | Transmittance (%) | | 84.7 | 84.9 | 84.1 | 85.2 |
| | Turbidity (%) | | 7.3 | 7.2 | 7.3 | 7.1 |
| | Particle non-uniformity | | 3.74 | 3.50 | 3.64 | 3.62 |

PVA: Polyvinyl alcohol

TABLE 6

| Classification | | | Example 18 | Comparative Example 7 | Comparative Example 8 | Comparative Example 9 | Comparative Example 10 |
|---|---|---|---|---|---|---|---|
| PVA | Input timing | | After the termination of polymerization | After the termination of polymerization | After the termination of polymerization | — | — |
| | Degree of hydrolysis (mol %) | | 99 | 99 | 99 | — | — |
| | Amount | g | 1,056 | 4.4 | 1,200 | 0 | 0 |
| | | parts by weight | 0.480 | 0.002 | 0.545 | 0 | 0 |
| Properties | Thermal stability | | 40.1 | 24.0 | 26.4 | 23.7 | 23.7 |
| | Resin whiteness index | | 92 | 86 | 86 | 86 | 85 |

TABLE 6-continued

| Classification | Example 18 | Comparative Example 7 | Comparative Example 8 | Comparative Example 9 | Comparative Example 10 |
|---|---|---|---|---|---|
| a value | 0.5 | 1.1 | 1.1 | 1.2 | 1.4 |
| Transmittance (%) | 87.5 | 78.0 | 75.4 | 77.6 | 76.3 |
| Turbidity (%) | 6.3 | 10.3 | 11.0 | 10.4 | 10.8 |
| Particle non-uniformity | 3.65 | 3.62 | 3.60 | 3.68 | 3.55 |

PVA: Polyvinyl alcohol

TABLE 7

| Classification | | | Comparative Example 11 | Comparative Example 12 |
|---|---|---|---|---|
| Polymerization method | | | Suspension polymerization | Suspension polymerization |
| PVA | Input timing | | Before the initiation of polymerization | Before the initiation of preliminary polymerization, Before the initiation of main polymerization |
| | Degree of hydrolysis (mol %) | | 78.5/40.7 | 40/80 |
| | Amount | g | 150/100 | 300/250 |
| | | parts by weight | 0.05/0.03 | 0.08/0.07 |
| Properties | Thermal stability | | 28.5 | 27.1 |
| | Resin whiteness index | | 90 | 90 |
| | a value | | 0.7 | 0.7 |
| | Transmittance (%) | | 80.7 | 79.4 |
| | Turbidity (%) | | 9.3 | 9.6 |
| | Particle non-uniformity | | 15.62 | 15.13 |

PVA: Polyvinyl alcohol

Referring to Table 1 and Table 2, in the case of Example 1 in which polyvinyl alcohol whose degree of hydrolysis was 40 mol % was input in an amount of 0.005 parts by weight in a preliminary polymerization step, thermal stability, color characteristics, and transparency were excellent. In addition, in the case of Examples 2 and 3 in which polyvinyl alcohol whose degree of hydrolysis was 80 mol % was input in an amount of 0.005 parts by weight and 0.050 parts by weight, respectively, in a preliminary polymerization step, thermal stability, color characteristics, and transparency were excellent. Additionally, in the case of Examples 4 to 6 in which polyvinyl alcohol whose degree of hydrolysis was 99 mol % was input in an amount of 0.003 to 0.480 parts by weight in a preliminary polymerization step, thermal stability, color characteristics, and transparency were excellent. However, in the case of Comparative Example 1 in which polyvinyl alcohol whose degree of hydrolysis was 99 mol % was input in an amount of about 0.002 parts by weight in a preliminary polymerization step, thermal stability, color characteristics, and transparency were degraded, as compared to Examples 4 to 6. In addition, in the case of Comparative Example 2 in which polyvinyl alcohol whose degree of hydrolysis was 99 mol % was input in an amount of about 0.545 parts by weight in a preliminary polymerization step, thermal stability, color characteristics, and transparency were degraded, as compared to Examples 1 to 6.

In addition, in the case of Comparative Example 3 in which tetrasodium diphosphate instead of polyvinyl alcohol was input in a preliminary polymerization step, thermal stability, color characteristics, and transparency were degraded, compared to Examples 1 to 6.

Referring to Tables 3 and 4, in the case of Example 7 in which polyvinyl alcohol whose degree of hydrolysis was 40 mol % was input in an amount of 0.005 parts by weight in a main polymerization step, thermal stability, color characteristics, and transparency were excellent.

In the case of Examples 8 and 9 in which polyvinyl alcohol whose degree of hydrolysis was 80 mol % was input in an amount of 0.050 parts by weight and 0.200 parts by weight, respectively, in a main polymerization step, thermal stability, color characteristics, and transparency were excellent.

In addition, in the case of Examples 10 to 13 in which polyvinyl alcohol whose degree of hydrolysis was 99 mol % was input in an amount of 0.003 to 0.480 parts by weight in a main polymerization step, thermal stability, color characteristics, and transparency were excellent. However, in the case of Comparative Example 4 in which polyvinyl alcohol whose degree of hydrolysis was 99 mol % was input in an amount of about 0.002 parts by weight in a main polymerization step, thermal stability, color characteristics, and transparency were degraded, as compared to Examples 10 to 13. Additionally, in the case of Comparative Example 5 in which polyvinyl alcohol whose degree of hydrolysis was 99 mol % was input in an amount of about 0.545 parts by weight in a main polymerization step, thermal stability, color characteristics, and transparency were degraded, as compared to Examples 7 to 13.

In addition, in the case of Comparative Example 6 in which tetrasodium diphosphate instead of polyvinyl alcohol was input in a main polymerization step, thermal stability, color characteristics, and transparency were degraded, as compared to Examples 7 to 13.

Referring to Tables 5 and 6, in the case of Example 14 in which polyvinyl alcohol whose degree of hydrolysis was 40 mol % was input in an amount of 0.015 parts by weight after the termination of the main polymerization, thermal stability, color characteristics, and transparency were excellent.

In the case of Example 15 in which polyvinyl alcohol whose degree of hydrolysis was 88 mol % was input in an amount of 0.015 parts by weight after the termination of the main polymerization, thermal stability, color characteristics, and transparency were excellent.

In the case of Examples 16 to 18 in which polyvinyl alcohol whose degree of hydrolysis was 99 mol % was input in an amount of 0.003 parts by weight to 0.480 parts by weight after the termination of the main polymerization, thermal stability, color characteristics, and transparency were excellent. However, in the case of Comparative Example 7 in which polyvinyl alcohol whose degree of hydrolysis was 99 mol % was input in an amount of about 0.002 parts by weight after the termination of the main polymerization, thermal stability, color characteristics, and transparency were degraded, as compared to Examples 16 to 18. In addition, in the case of Comparative Example 8 in which polyvinyl alcohol whose degree of hydrolysis was 99 mol % was input in an amount of about 0.545 parts by weight after the termination of the main polymerization, thermal stability, color characteristics, and transparency were degraded, as compared to Examples 14 to 18.

Meanwhile, in the case of Comparative Example 9 in which polyvinyl alcohol was not input at all, and when a polymerization conversion rate reached 60%, 200 g of butylated hydroxytoluene was input instead of 15 g of 4-hydroxy-2,2,6,6-tetramethyl-piperidine-1-oxyl and 100 g of triethylene glycol-bis-3-(3-t-butyl-4-hydroxy-5-methylphenyl)propionate, thermal stability, color characteristics, and transparency were degraded, as compared to Examples 1 to 18.

In addition, in the case of Comparative Example 10 in which a vinyl chloride polymer was prepared in the same manner as in Comparative Example 9 except that di-2-ethylhexyl peroxydicarbonate instead of t-butyl peroxy neodecanoate was input into a preliminary polymerization reactor, thermal stability, color characteristics, and transparency were degraded, as compared to Examples 1 to 18. In the case of Comparative Examples 11 and 12 in which vinyl chloride polymers were prepared by suspension polymerization, thermal stability and transparency were degraded, as compared to Examples 1 to 18.

The invention claimed is:

1. A method of preparing a vinyl chloride-based polymer composite, comprising:

a first step of performing a bulk polymerization of vinyl chloride-based monomers; and a second step of recovering unreacted vinyl chloride-based monomers after completion of the bulk polymerization; and obtaining the vinyl chloride-based polymer composite, wherein polyvinyl alcohol is added in at least one step of the first step and the second step, and the polyvinyl alcohol is added in an amount of 0.003 parts by weight to 0.500 parts by weight based on a total of 100 parts by weight of the vinyl chloride-based monomers, wherein the vinyl chloride-based monomer is a pure vinyl chloride monomer or a monomer mixture including the pure vinyl chloride monomer and a vinyl-based monomer copolymerizable with the pure vinyl chloride monomer, wherein the monomer mixture includes the vinyl-based monomer in an amount of 1 to 50 parts by weight based on 100 parts by weight of the vinyl chloride monomer, wherein the polyvinyl alcohol has a degree of hydrolysis of 90 mol % to 99 mol %.

2. The method of preparing a vinyl chloride-based polymer composite of claim 1, wherein the performing a bulk polymerization includes:

a preliminary polymerization of performing a bulk polymerization of first vinyl chloride-based monomers to form particle nuclei; and a main polymerization of performing a bulk polymerization of the particle nuclei and second vinyl chloride-based monomers, wherein the polyvinyl alcohol is added in at least one of the preliminary polymerization or the main polymerization.

3. The method of preparing a vinyl chloride-based polymer composite of claim 2, wherein the main polymerization includes a bulk polymerization of the particle nuclei, the first vinyl chloride-based monomers unreacted in the preliminary polymerization step, and the second vinyl chloride-based monomers.

4. The method of preparing a vinyl chloride-based polymer composite of claim 1, wherein the polyvinyl alcohol is added after the recovering unreacted vinyl chloride-based monomers when added in the second step.

5. The method of preparing a vinyl chloride-based polymer composite of claim 1, wherein the second step further includes a post-treatment of thermally treating the vinyl chloride-based polymer composite after the recovering unreacted vinyl chloride-based monomers, wherein the polyvinyl alcohol is added after the recovery of unreacted vinyl chloride-based monomers and before the post-treatment when added in the second step.

6. The method of preparing a vinyl chloride-based polymer composite of claim 1, wherein the polyvinyl alcohol is added in a solid state if added in the performing a bulk polymerization of vinyl chloride-based monomers, and the polyvinyl alcohol is added in a solid state or an aqueous solution if added in the recovering unreacted vinyl chloride-based monomers.

7. The method of claim 1, wherein the polyvinyl alcohol has a viscosity of 3 to 80 pa·s as measured at 20° C. in a 4 wt % aqueous solution.

8. The method of preparing a vinyl chloride-based polymer composite of claim 1, wherein the polyvinyl alcohol has a degree of polymerization of 200 to 3,500.

9. The method of preparing a vinyl chloride-based polymer composite of claim 1, wherein the vinyl chloride-based polymer composite is formed by adsorbing the polyvinyl alcohol onto the vinyl chloride-based polymer.

* * * * *